(12) United States Patent
Ishida et al.

(10) Patent No.: US 10,414,415 B1
(45) Date of Patent: Sep. 17, 2019

(54) EXPANSION DEVICE OF PANELS

(71) Applicants: NARITA MFG., LTD., Nagoya-Shi, Aichi (JP); TOKYO METROPOLITAN UNIVERSITY, Tokyo (JP); GrandTech Fujimoto Co., Ltd, Nagoya-Shi, Aichi (JP)

(72) Inventors: Jozo Ishida, Nagoya (JP); Iri Takeshita, Nagoya (JP); Naoyuki Takesue, Hino (JP); Hideo Fujimoto, Nagoya (JP)

(73) Assignees: NARITA MFG., LTD., Nagoya-Shi, Aichi (JP); TOKYO METROPOLITAN UNIVERSITY, Tokyo (JP); GrandTech Fujimoto Co., Ltd., Nagoya-Shi, Aichi (JP)

( * ) Notice: Subject to any disclaimer, the term of this patent is extended or adjusted under 35 U.S.C. 154(b) by 0 days.

(21) Appl. No.: 15/909,148

(22) Filed: Mar. 1, 2018

(30) Foreign Application Priority Data

Feb. 27, 2018 (JP) .................................. 2018-033189

(51) Int. Cl.
*B61D 17/20* (2006.01)
*B60D 5/00* (2006.01)
(Continued)

(52) U.S. Cl.
CPC ............... *B61D 17/20* (2013.01); *B60D 5/00* (2013.01); *B60D 5/006* (2013.01); *B61D 17/22* (2013.01); *E04B 1/3448* (2013.01); *E04B 1/6129* (2013.01)

(58) Field of Classification Search
CPC .......... B61D 17/20; B61D 17/22; B60D 5/00; B60D 5/006; E04B 1/3448; E04B 1/6129
(Continued)

(56) References Cited

U.S. PATENT DOCUMENTS 5,590,833 A    1/1997  Benenowski et al.
5,724,892 A *  3/1998  Melzer .................. B61D 17/20
                                                    105/15
(Continued)

FOREIGN PATENT DOCUMENTS

CN    1478028 A     2/2004
CN    106985845 A   7/2017
(Continued)

OTHER PUBLICATIONS

Extended European Search Report dated Oct. 5, 2018 in corresponding Application No. 18159993 (7 pages).
(Continued)

*Primary Examiner* — Zachary L Kuhfuss
(74) *Attorney, Agent, or Firm* — Harness, Dickey & Pierce, P.L.C.

(57) ABSTRACT

A first constituent member constructed such that at least portions of a plurality of panels overlap and a second constituent member constructed such that at least portions of a plurality of panels overlap are included, in which the first constituent member and the second constituent member are connected to a link member that can be expanded and contracted, the first constituent member and the second constituent member are expanded and contracted by expansion and contraction of the link member, and the first constituent member and the second constituent member can relatively be rotated around rotation axes.

3 Claims, 12 Drawing Sheets

(51) Int. Cl.
*B61D 17/22* (2006.01)
*E04B 1/344* (2006.01)
*E04B 1/61* (2006.01)

(58) Field of Classification Search
USPC .................................................. 105/8.1, 15
See application file for complete search history.

(56) References Cited

U.S. PATENT DOCUMENTS

| | | |
|---|---|---|
| 9,321,469 B2 | 4/2016 | Hann |
| 2015/0000550 A1 | 1/2015 | Hjort et al. |
| 2015/0101505 A1 | 4/2015 | Tsai |
| 2018/0056741 A1* | 3/2018 | Krug ..................... B60D 5/006 |

FOREIGN PATENT DOCUMENTS

| | | |
|---|---|---|
| EP | 0722873 A1 | 7/1996 |
| EP | 2700553 A1 | 2/2014 |
| EP | 3287305 A1 | 2/2018 |

OTHER PUBLICATIONS

Office Action dated Sep. 28, 2018 in corresponding TW Application No. 10720892810 (4 pages).

* cited by examiner

EXPANSION DEVICE OF PANELS

BACKGROUND OF THE INVENTION

Field of the Invention

The present invention relates to an expansion device of panels.

Description of the Related Art

An expansion device 101 of panels shown in FIGS. 12 and 13 has been known as a device constituting an inner wall such as a sidewall, an upper wall, or a lower wall of a connecting passage formed inside a hood provided between bodies of rolling stock.

The expansion device 101 of panels includes side panels 102, 103 coupled to end surfaces 110a, 111a of bodies 110, 111 that are coupled to each other rotatably around axes 102a, 103a in an up and down direction respectively and a central panel 104 provided on an outer side of the side panels 102, 103 is arranged so as to be positioned in a substantially central portion between the end surfaces 110a, 111a and movable in a direction between the end surfaces 110a, 111a due to a link member 105.

Further, the link member 105 is connected to the outer side of the central panel 104 and also both sides thereof are rotatably connected to axes 110b, 111b in the up and down direction provided on the end surfaces 110a, 111a of the bodies 110, 111.

Then, the expansion device 101 of panels constitutes inner walls 114 such as a sidewall, an upper wall, and a lower wall of a connecting passage 113 provided in the bodies 110, 111.

SUMMARY OF THE INVENTION

In the expansion device 101 of panels in the above conventional technology, the length in the direction between the end surfaces 110a, 111a of the bodies 110, 111 cannot be made shorter than the length in a state in which inner-side tips of the side panels 102, 103 abut on each other and it is necessary to increase the number of panels to make the length shorter. However, the side panels 102, 103 are rotatably connected to the end surfaces 110a, 111a, the central panel 104 is connected to the link member 105, and the side panels 102, 103 and the central panel 104 are controlled by different mechanisms and so a problem that it is difficult to increase the number of panels with ease is posed.

An object of the present invention is to propose an expansion device of panels capable of making shorter the length in a direction of both ends thereof when the length is made the shortest by, compared with an expansion device of panels of the conventional technology, increasing the number of panels.

To solve the above problem, the present invention includes a first constituent member constructed such that at least portions of a plurality of panels overlap and a second constituent member constructed such that at least portions of a plurality of panels overlap, in which the first constituent member and the second constituent member are connected to a link member that can be expanded and contracted, the first constituent member and the second constituent member are expanded and contracted by expansion and contraction of the link member, and the first constituent member and the second constituent member can relatively be rotated around rotation axes.

The link member may include a first main arm member and a second main arm member arranged mutually in an X shape, a first parallel arm member may be provided in parallel with the first main arm member and also rotatably connected to one end of the second main arm member, a second parallel arm member may be provided in parallel with the first main arm member and also rotatably connected to the other end of the second main arm member, one or a plurality of connecting arm members may be provided in parallel with the second main arm member and also one end thereof may be rotatably connected to the first parallel arm member and the other end thereof may be rotatably connected to the first main arm member, one or a plurality of connecting arm members may be provided in parallel with the second main arm member and also one end thereof may be rotatably connected to the first main arm member and the other end thereof may be rotatably connected to the second parallel arm member, the link member may be provided so as to be able to rotate around an axis perpendicular to an expansion/contraction direction of the link member with respect to the first constituent member and the second constituent member, both ends in the expansion/contraction direction of the link member may be connected to panels positioned outermost in the first constituent member and the second constituent member respectively, and any one connecting arm member in the link member and a panel that is not positioned on both ends of the first constituent member and the second constituent member may be connected.

The first constituent member and the second constituent member may be connected such that each can be parallel to or in an inclined positional relation to a direction of movement of members constituting the link member.

The expansion device of panels may be provided between bodies of rolling stock.

The present invention includes a first constituent member constructed such that at least portions of a plurality of panels overlap and a second constituent member constructed such that at least portions of a plurality of panels overlap, in which the first constituent member and the second constituent member are connected to a link member that can be expanded and contracted, the first constituent member and the second constituent member are expanded and contracted by expansion and contraction of the link member, and the first constituent member and the second constituent member can relatively be rotated around rotation axes so that the number of constituent panels can be made larger than that of the conventional technology and also the maximum length between both ends thereof can be made longer and the minimum length can be made shorter. Also, for example, a case in which an axis in an up and down direction of one body on which the expansion device of panels is mounted and an axis in an up and down direction of the other body are mutually inclined can also be satisfactorily responded to. Other objects, features and advantages of the invention will become apparent from the following description of the embodiments of the invention taken in conjunction with the accompanying drawings.

DESCRIPTION OF THE EMBODIMENTS

The expansion device of panels according to the present invention can suitably be used as constituting at least one of a sidewall, an upper wall, and a lower wall as inner walls of a connecting passage provided between bodies of a vehicle including a plurality of bodies such as rolling stock and a connected bus and in the following embodiments, the description is based on embodiments applied to the sidewall of a connecting passage of rolling stock. In the diagrams, profile lines are omitted to avoid complication of diagrams.

First Embodiment

Figure 1:
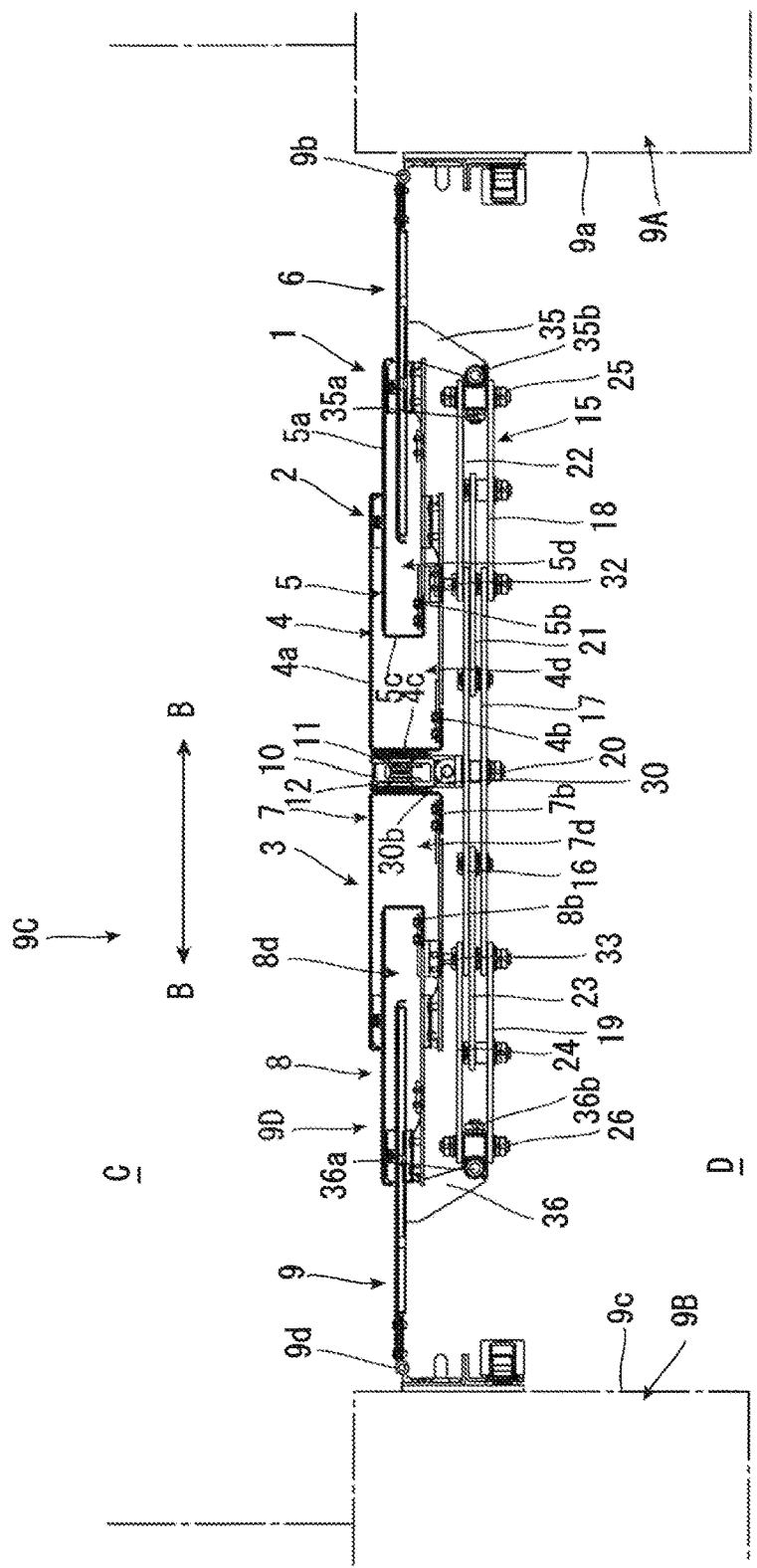
FIG. 1 is a top view when an expansion device of panels according to a first embodiment of the present invention is applied as a sidewall of a connecting passage by providing the expansion device between bodies of rolling stock.

FIG. 1 is a top view when an expansion device 1 of panels according to a first embodiment of the present invention is applied as a sidewall 9D of a connecting passage 9C by providing the expansion device 1 between bodies 9A, 9B of rolling stock. Hereinafter, an A-A direction in FIG. 2 is assumed to be an up and down direction, a B-B direction to be a direction between end surfaces (horizontal direction) of bodies, an upper side of FIG. 1 to be an inner side C, and a lower side to be an outer side D.

Figure 2:
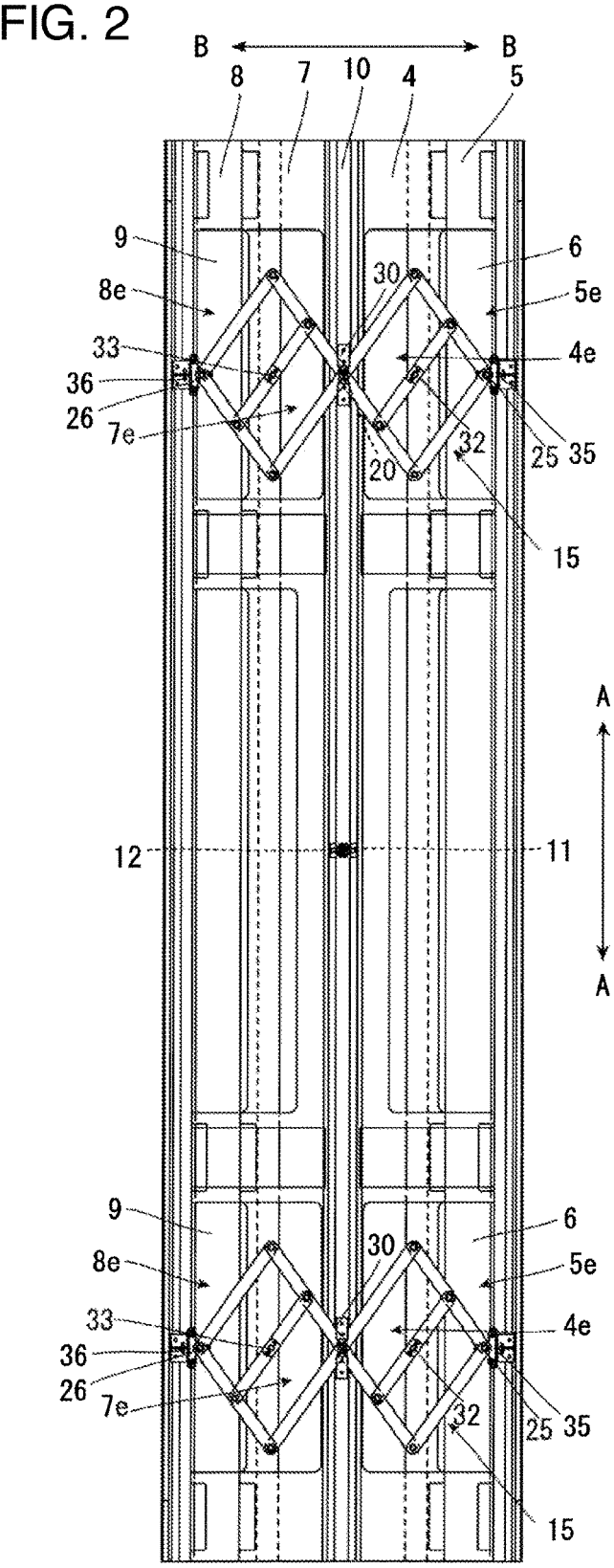
FIG. 2 is a diagram when the expansion device of panels in FIG. 1 is viewed from outside.

The expansion device 1 of panels includes, as shown in FIGS. 1 and 2, a first constituent member 2 and a second constituent member 3.

The first constituent member 2 includes, as shown in FIGS. 1 and 2, three panels of a first panel 4, a second panel 5, and a third panel 6 and these panels are disposed such that at least portions of neighboring panels overlap with each other in the B-B direction (horizontal direction) between end surfaces 9a, 9c of the bodies 9A, 9B. Also, the second constituent member 3 includes, as shown in FIGS. 1 and 2, three panels of a fourth panel 7, a fifth panel 8, and a sixth panel 9 and these panels are disposed such that at least portions of neighboring panels overlap with each other in the B-B direction (horizontal direction) between end surfaces 9a, 9c of the bodies 9A, 9B.

Figure 3:
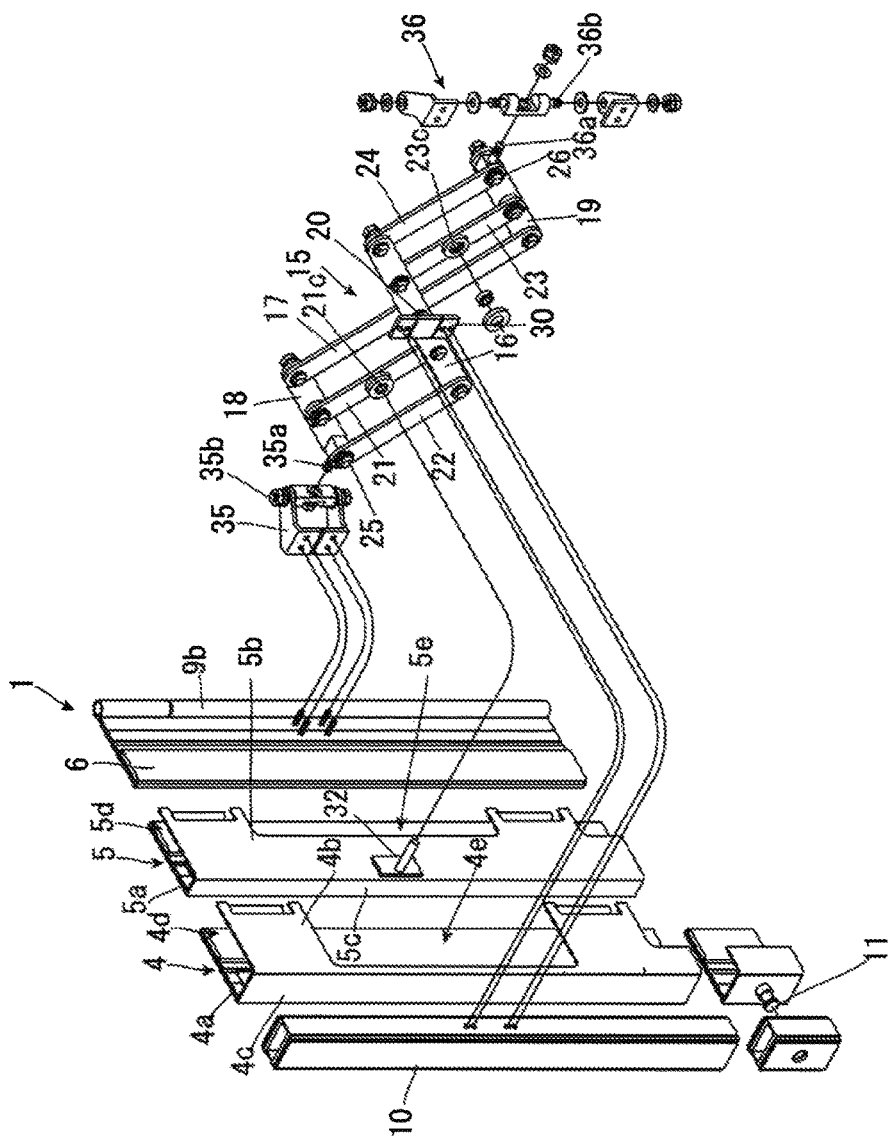
FIG. 3 is an exploded perspective view showing a portion of a member constituting a first constituent member used in the first embodiment of the present invention.

The first panel 4 is formed such that, as shown in FIGS. 1 to 3, an inner-side piece 4a and an outer-side piece 4b are formed substantially in parallel by a plate member being bent and also ends on the opposite side of the second panel 5 in the horizontal direction of the inner-side piece 4a and the outer-side piece 4b are connected by a connecting portion 4c so that the cross section thereof is formed in a U-shape and also the second panel 5 side in the horizontal B-B direction and the vertical A-A direction are open. Accordingly, a housing space 4d open on the second panel 5 side and in the vertical A-A direction is formed in the first panel 4. Also, as shown in FIGS. 1 to 3, a notch 4e that is open only in a front and rear direction and on the second panel 5 side is formed in a vertical portion of the outer-side piece 4b of the first panel 4.

The second panel 5 is formed such that an inner-side piece 5a and an outer-side piece 5b are formed substantially in parallel by a plate member being bent and also ends on the opposite side of the third panel 6 in the horizontal direction of the inner-side piece 5a and the outer-side piece 5b are connected by a connecting portion 5c so that the cross section thereof is formed in a U-shape and also the third panel 6 side in the horizontal B-B direction and the vertical A-A direction are open. Accordingly, a housing space 5d open on the third panel 6 side and in the vertical A-A direction is formed in the second panel 5. Also, as shown in FIGS. 1 to 3, a notch 5e that is open only in the front and rear direction and on the third panel 6 side is formed in a vertical portion of the outer-side piece 5b of the second panel 5.

The second panel 5 is housed, as shown in FIG. 1, inside the housing space 4d of the first panel 4 in such a way that the third panel 6 side protrudes and also disposed slidably with respect to the first panel 4 in an overlapping direction of panels such as the horizontal B-B direction or the vertical A-A direction.

Also, the third panel 6 is formed from a plate member, one end thereof in the horizontal B-B direction is connected to the end surface 9a of one body 9A rotatably around a rotation axis 9b in the up and down direction, the other end in the horizontal B-B direction of the third panel 6 is housed inside the housing space 5d of the second panel 5 such that the end surface 9a side protrudes. Also, the third panel 6 is relatively slidably with respect to the second panel 5 in the horizontal B-B direction and the vertical A-A direction.

The fourth panel 7 is formed, as shown in FIG. 1, in a structure obtained by horizontally inverting the first panel 4 in the horizontal B-B direction, the fifth panel 8 is formed in a structure obtained by horizontally inverting the second panel 5 in the horizontal B-B direction, and the sixth panel 9 is formed in a structure obtained by horizontally inverting the third panel 6 in the horizontal B-B direction.

The fifth panel 8 is housed, as shown in FIG. 1, inside a housing space 7d of the fourth panel 7 in such a way that the sixth panel 9 side protrudes and also disposed slidably with respect to the fourth panel 7 in the horizontal B-B direction and the vertical A-A direction.

Also, the other end of the sixth panel 9 is connected to the end surface 9c of the other body 9B rotatably around a rotation axis 9d in the up and down direction and one end in the horizontal B-B direction of the sixth panel 9 is housed inside a housing space 8d of the fifth panel 8 such that the end surface 9c side protrudes. Also, the sixth panel 9 is relatively slidably with respect to the fifth panel 8 in an overlapping direction of panels such as the horizontal B-B direction or the vertical A-A direction.

A columnar member 10 formed like a rectangular column is provided upright, as shown in FIGS. 1 to 3, between the first constituent member 2 and the second constituent member 3 substantially entirely in the vertical A-A direction. In a central portion in an upright direction of the columnar member 10, as shown in FIGS. 1 to 3, the first panel 4 of the first constituent member 2 is perpendicular to the upright direction of the columnar member 10 and also connected rotatably around a rotation axis 11 provided in the horizontal B-B direction.

Also in the central portion in the upright direction of the columnar member 10, as shown in FIGS. 1 to 3, the fourth panel 7 of the second constituent member 3 is perpendicular to the upright direction of the columnar member 10 and also connected rotatably around a rotation axis 12 provided in the horizontal B-B direction.

Accordingly, the first constituent member 2 and the second constituent member 3 are perpendicular to the upright direction of the columnar member 10 and also can relatively rotate around the rotation axes 11, 12 provided in the horizontal B-B direction.

As shown in FIG. 2, link members 15, 15 that can be expanded and contracted are connected to the first constituent member 2 and the second constituent member 3 in upper and lower portions thereof.

Figure 4:
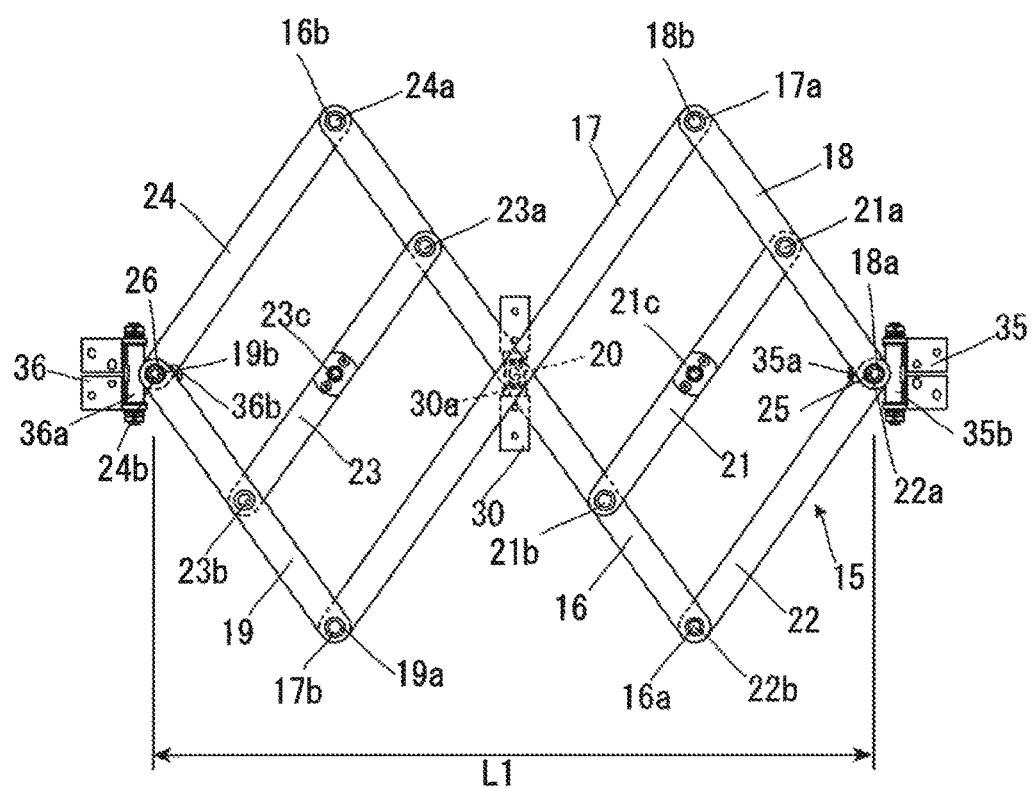
FIG. 4 is a side view of a link member used in the first embodiment of the present invention.

The link member 15 includes, as shown in FIG. 4, a first main arm member 16 and a second main arm member 17 formed like a long flat plate and the first main arm member 16 and the second main arm member 17 are connected in respective central portions in the axial direction in an X shape rotatably around a rotation axis 20 in the front and rear direction of the main arm members 16, 17.

The other end 18*b* of a first parallel arm member 18 formed like a long flat plate is rotatably connected to one end 17*a* of the second main arm member 17. Further, the first parallel arm member 18 is disposed so as to be parallel to the first main arm member 16.

One end 19*a* of a second parallel arm member 19 formed like a long flat plate is rotatably connected to the other end 17*b* of the second main arm member 17. Further, the second parallel arm member 19 is disposed so as to be parallel to the first main arm member 16 and the first parallel arm member 18.

One end 21*a* of a first connecting arm member 21 formed like a long flat plate is rotatably connected to the central portion in the axial direction of the first parallel arm member 18 and the other end 21*b* thereof is rotatably connected to the central portion between the rotation axis 20 and one end 16*a* of the first main arm member 16. Further, the first connecting arm member 21 is disposed so as to be parallel to the second main arm member 17.

One end 22*a* of a second connecting arm member 22 formed like a long flat plate is connected to one end 18*a* of the first parallel arm member 18 rotatably around a rotation axis 25 and the other end 22*b* thereof is rotatably connected to the one end 16*a* of the first main arm member 16. Further, the second connecting arm member 22 is disposed so as to be parallel to the second main arm member 17 and the first connecting arm member 21. Incidentally, the second connecting arm member 22 may not be provided.

One end 23*a* of a third connecting arm member 23 formed like a long flat plate is rotatably connected to the central portion between the rotation axis 20 and the other end 16*b* of the first main arm member 16 and the other end 23*b* thereof is rotatably connected to the central portion in the axial direction of the second parallel arm member 19. Further, the third connecting arm member 23 is disposed so as to be parallel to the second main arm member 17.

One end 24*a* of a fourth connecting arm member 24 formed like a long flat plate is connected to the other end 16*b* of the first main arm member 16 and the other end 24*b* thereof is connected to the other end 19*b* of the second parallel arm member 19 rotatably around a rotation axis 26. Further, the fourth connecting arm member 24 is disposed so as to be parallel to the second main arm member 17 and the third connecting arm member 23. Incidentally, the fourth connecting arm member 24 may not be provided.

Thus, four connecting arm members 21, 22, 23, 24 are provided in parallel between the first main arm member 16 and the parallel arm members 18, 19.

Figure 5:
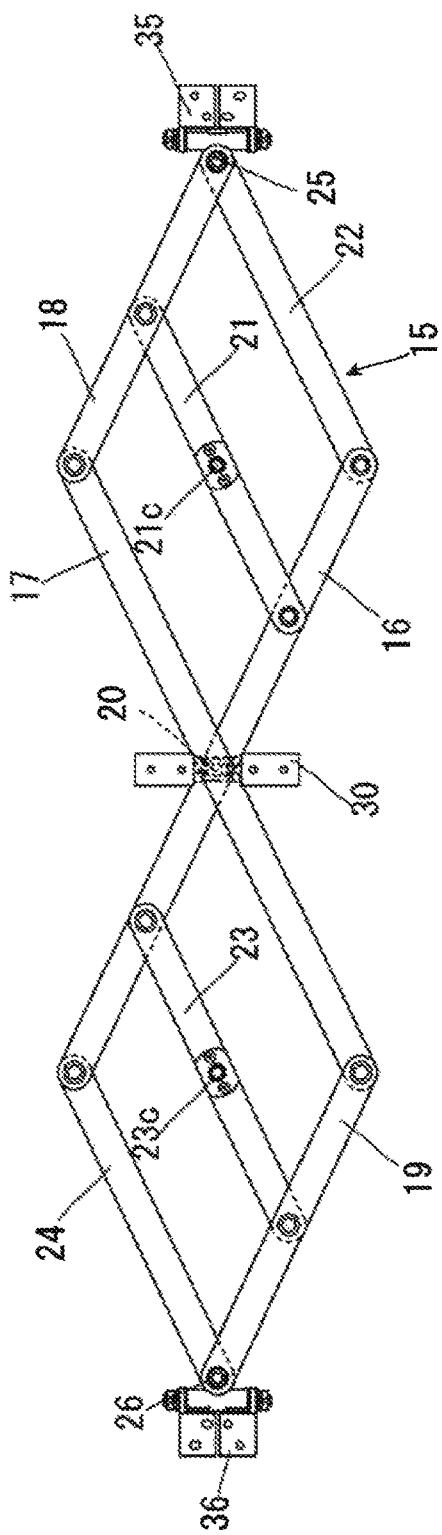
FIG. 5 is a diagram obtained by expanding in a left and right direction from the state of FIG. 4.
Figure 6:
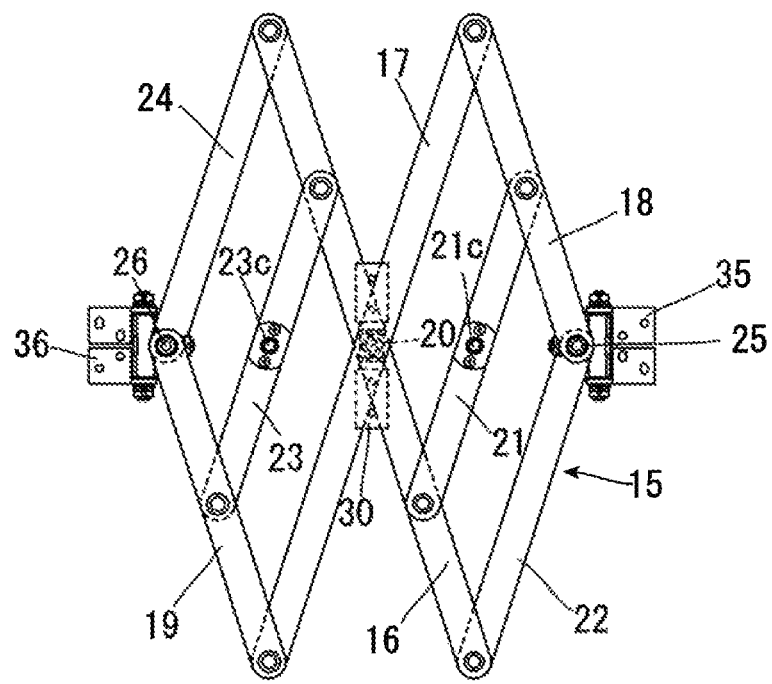
FIG. 6 is a diagram obtained by contracting in the left and right direction from the state of FIG. 4.

With the above configuration, the link members 15 constitute a parallel link and can expand a distance L1 between the rotation axis 25 provided in the first parallel arm member 18 and the rotation axis 26 provided in the second parallel arm member 19, as shown in FIG. 5, from the state shown in FIG. 4 or contract the distance L1, as shown in FIG. 6.

The rotation axis 20 of the link member 15 is disposed so as to be perpendicular to the upright direction (A-A direction) of the columnar member 10 with respect to the columnar member 10 and also connected via a connecting member 30 including a rotation axis 30*a* provided in the upright direction (A-A direction) of the columnar member 10.

Accordingly, the link member 15 can rotate clockwise and counterclockwise in FIG. 2 around the rotation axis 20 perpendicular to the upright direction (A-A direction) of the columnar member 10 with respect to the columnar member 10 and also rotate in the up and down direction of FIG. 1 (the front and rear direction of FIG. 2) around a rotation axis 30*b* provided in the upright direction thereof so that the direction of movement of the members 16, 17, 18, 19, 21, 22, 23, 24 constituting the link member 15 can be made to be parallel to an outer side surface of the columnar member 10 or in an inclined positional relation thereto.

The rotation axis 20 of at least one link member 15 of the two link members 15, 15 can move in the upright direction (A-A direction) of the columnar member 10 with respect to the columnar member 10.

Accordingly, for example, a case in which the distance between the rotation axis 20 in the link member 15 on the upper side and the rotation axis 20 in the link member 15 on the lower side is changed from the state in which the length in the horizontal B-B direction of the link member 15 on the upper side and that of the link member 15 on the lower side are the same by contracting the link member 15 on the upper side in the horizontal B-B direction and expanding the link member 15 on the lower side in the horizontal B-B direction can be dealt with.

A rotation axis 32 projected so as to be perpendicular, as shown in FIG. 3, to the outer-side piece 5*b* is disposed in the second panel 5 of the first constituent member 2 so as to be positioned in the notch 4*e* of the first panel 4 so that, when the first panel 4 slides relative to the second panel 5 in an overlapping direction of panels such as the horizontal B-B direction or the vertical A-A direction, the rotation axis 32 and the first panel 4 will not interfere with each other.

A connecting hole 21*c* provided in the central portion in the axial direction of the first connecting arm member 21 is loosely fitted and rotatably connected to the rotation axis 32. Incidentally, the rotation axis 32 may be provided on the first connecting arm member 21 side by forming the connecting hole 21*c* on the outer-side piece 5*b* side of the second panel 5.

A rotation axis 33 projected so as to be perpendicular to an outer-side piece 8*b* is disposed in the fifth panel 8 of the second constituent member 3 so as to be positioned, as shown in FIG. 2, in a notch 7e of the fourth panel 7 so that, when the fourth panel 7 slides relative to the fifth panel 8 in an overlapping direction of panels such as the horizontal B-B direction or the vertical A-A direction, the rotation axis 33 and the fourth panel 7 will not interfere with each other.

A connecting hole 23c provided in the central portion in the axial direction of the third connecting arm member 23 is loosely fitted and rotatably connected to the rotation axis 33. Incidentally, the rotation axis 33 may be provided on the third connecting arm member 23 side by forming the connecting hole 23c on the outer-side piece 8b side of the fifth panel 8.

With connecting holes 21a, 23a of the connecting arm members 21, 23 loosely fitted to the rotation axes 32, 33, when the link member 15 rotates around a rotation axis 30b provided in the upright direction with respect to the columnar member 10 to be in a mutually inclined relation, the connecting arm members 21, 23 can move in an inward and outward direction of the bodies 9A, 9B and be in an inclined relation with respect to the rotation axes 32, 33.

A connecting arm member 35 is connected to the rotation axis 25 provided in the first parallel arm member 18 rotatably around a rotation axis 35a perpendicular to the rotation axis 25. Also, the connecting arm member 35 can rotate around a rotation axis 35b perpendicular to the rotation axis 35a. Further, the connecting arm member 35 is securely installed on the outer side of an outer-side piece 6b of the third panel 6 in the first constituent member 2. That is, the connecting arm member 35 includes a free joint capable of rotating in any direction and a rotation axis 25 portion provided in the first parallel arm member 18 is connected to the outer side of the third panel 6 via the free joint.

The connecting arm member 35 is provided so as to be positioned in the notch 5e of the second panel 5 and, when the third panel 6 slides relative to the second panel 5 in an overlapping direction of panels such as the horizontal B-B direction or the vertical A-A direction, the connecting arm member 35 and the second panel 5 will not interfere with each other.

A connecting arm member 36 is connected to the rotation axis 26 provided in the second parallel arm member 19 rotatably around a rotation axis 36a perpendicular to the rotation axis 26. Also, the connecting arm member 36 can rotate around a rotation axis 36b perpendicular to the rotation axis 36a. Further, the connecting arm member 36 is securely installed on the outer side of an outer-side piece 9b of the sixth panel 9 in the second constituent member 3. That is, the connecting arm member 36 includes a free joint capable of rotating in any direction and a rotation axis 26 portion provided in the second parallel arm member 19 is connected to the outer side of the sixth panel 9 via the free joint.

The connecting arm member 36 is provided, as shown in FIG. 2, so as to be positioned in the notch 8e of the fifth panel 8 and, when the sixth panel 9 slides relative to the fifth panel 8 in an overlapping direction of panels such as the horizontal B-B direction or the vertical A-A direction, the connecting arm member 36 and the fifth panel 8 will not interfere with each other.

With the above configuration, the panels 4, 5, 6 constituting the first constituent member 2 and the panels 7, 8, 9 constituting the second constituent member 3 each slide in an overlapping direction of panels (any direction on the paper of FIG. 2) such as the horizontal B-B direction or the vertical A-A direction accompanying expansion and contraction of the link member 15 and rotation around the rotation axis 20 of the link member 15 so that the first constituent member 2 and the second constituent member 3 can expand and contract in any direction of overlapping directions of panels.

The direction of movement of the members 16, 17, 18, 19, 21, 22, 23, 24 constituting the link member 15 can be made parallel to or in an inclined positional relation with respect to the first constituent member 2 or the second constituent member 3. That is, the first constituent member 2 and the second constituent member 3 mutually rotate around the rotation axes 11, 12 and even if, for example, a state in which the constituent members 2, 3 and the link member 15 are parallel as shown in FIG. 1 changes to a state in which the first constituent member 2 is closer to the link member 15 and the second constituent member 3 is farther from the link member 15, the link member 15 can rotate with respect to the first constituent member 2 and the second constituent member 3 around the rotation axes 35b, 36b of the connecting arm members 35, 36 and the rotation axis 30b of the connecting member 30 and in that state, the panels 4 to 9 constituting the first constituent member 2 and the second constituent member 3 can satisfactorily be moved by expanding or contracting.

By configuring as described above, regardless of whether the positional relation between an axis in the up and down direction of the one body 9A and an axis in the up and down direction of the other body 9B is parallel, inclined, distorted, close, or separate, while the expansion device 1 of panels according to the present invention is mounted between the end surfaces 9a, 9c of the bodies 9A, 9B, the expansion device 1 of panels can follow and respond to the positional relation.

If the axis in the up and down direction of the one body 9A and the axis in the up and down direction of the other body 9B change from, for example, a parallel state to a separate state or a close state, the expansion device 1 of panels can respond by the link member 15 being expanded or contracted in the horizontal B-B direction to allow the first constituent member 2 and the second constituent member 3 to expand or contract in the horizontal B-B direction.

If the axis in the up and down direction of the one body 9A and the axis in the up and down direction of the other body 9B change from a parallel state to a vertically shifted state, the expansion device 1 of panels can respond by the link member being rotated around the rotation axis 20 to allow panels constituting the first constituent member 2 and the second constituent member 3 to be mutually displaced in the vertical A-A direction.

If the axis in the up and down direction of the one body 9A and the axis in the up and down direction of the other body 9B change from a parallel state to a state in which only an upper portion or a lower portion is close, the expansion device 1 of panels can respond by only the link member 15 provided in the upper portion or the lower portion being contracted to allow only the upper portion or the lower portion of the first constituent member 2 and the second constituent member 3 to contract in the horizontal B-B direction.

If the axis in the up and down direction of the one body 9A and the axis in the up and down direction of the other body 9B change from a parallel state to a distorted state, the expansion device 1 of panels can respond by, for example, the first constituent member 2 and the second constituent member 3 being mutually rotated around the rotation axes 11, 12 and also the link member 15 being inclined toward the first constituent member 2 and the second constituent member 3.

Also, by constituting the expansion device 1 of panels using six panels 4 to 9, compared with the conventional technology in which three panels 102, 103, 104 are used, the maximum length of the distance between the bodies 9A, 9B can be made longer and the minimum length thereof can be made shorter.

Second Embodiment

In the first embodiment, the first constituent member 2 and the second constituent member 3 are each constituted using three panels, but the number of constituent panels can be set to any number if the number of panels constituting the first constituent member 2 and that constituting the second constituent member 3 are the same and the number of constituent panels is equal to 2 or greater.

Figure 7:
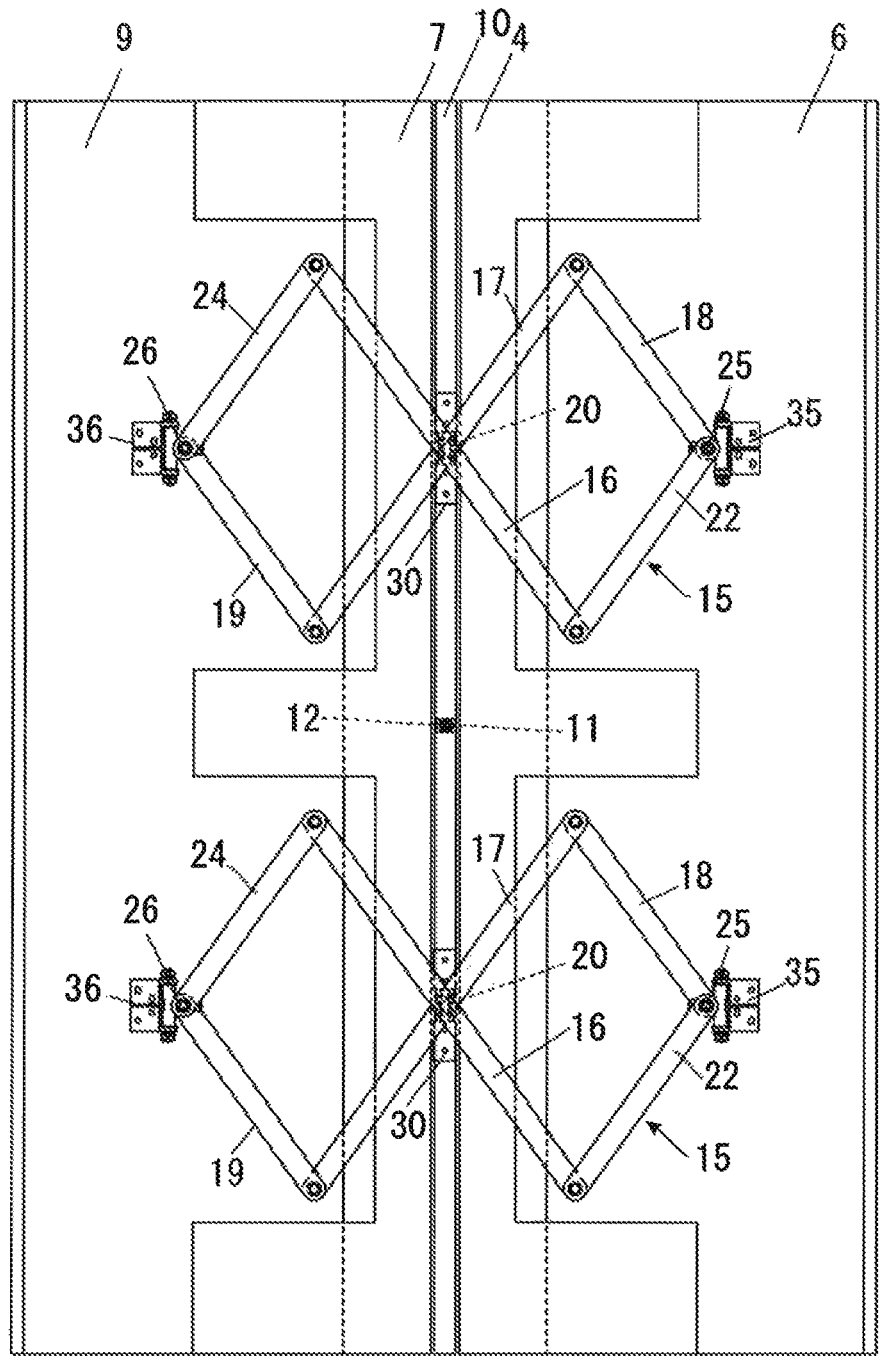
FIG. 7 is a schematic diagram when an example of the expansion device of panels according to a second embodiment of the present invention is viewed from outside a body.
Figure 8:
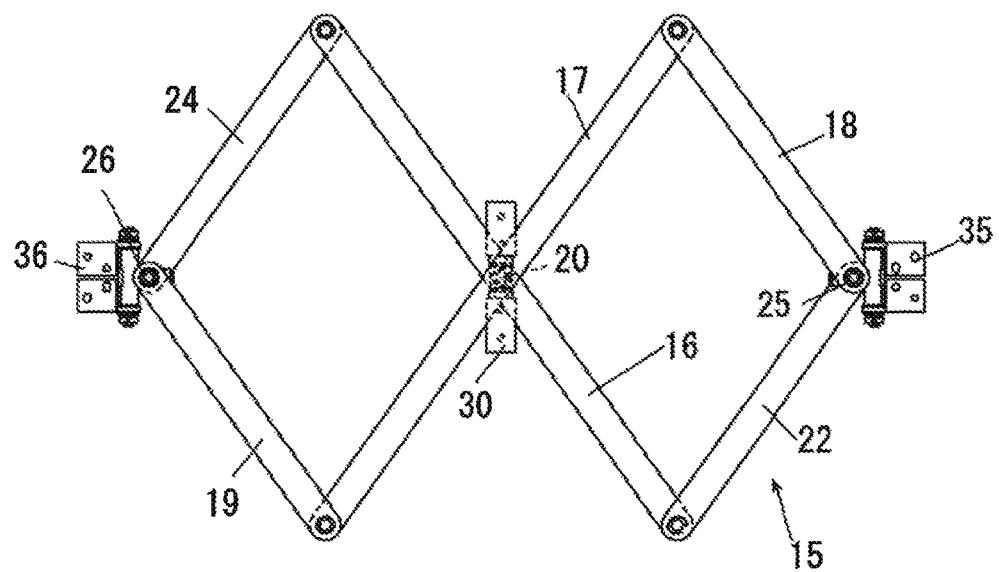
FIG. 8 is a side view of the link member used in FIG. 7.

For example, as shown in FIGS. 7 and 8, without using, among components of the first embodiment, the first connecting arm member 21, the third connecting arm member 23, the second panel 5, and the fifth panel 8, each constituent member can be constituted using two panels by using the first main arm member 16, the second main arm member 17, the first parallel arm member 18, the second parallel arm member 19, the second connecting arm member 22, and the fourth connecting arm member 24 and also the first panel 4, the third panel 6, the fourth pane 7, and the sixth panel 9.

Figure 9:
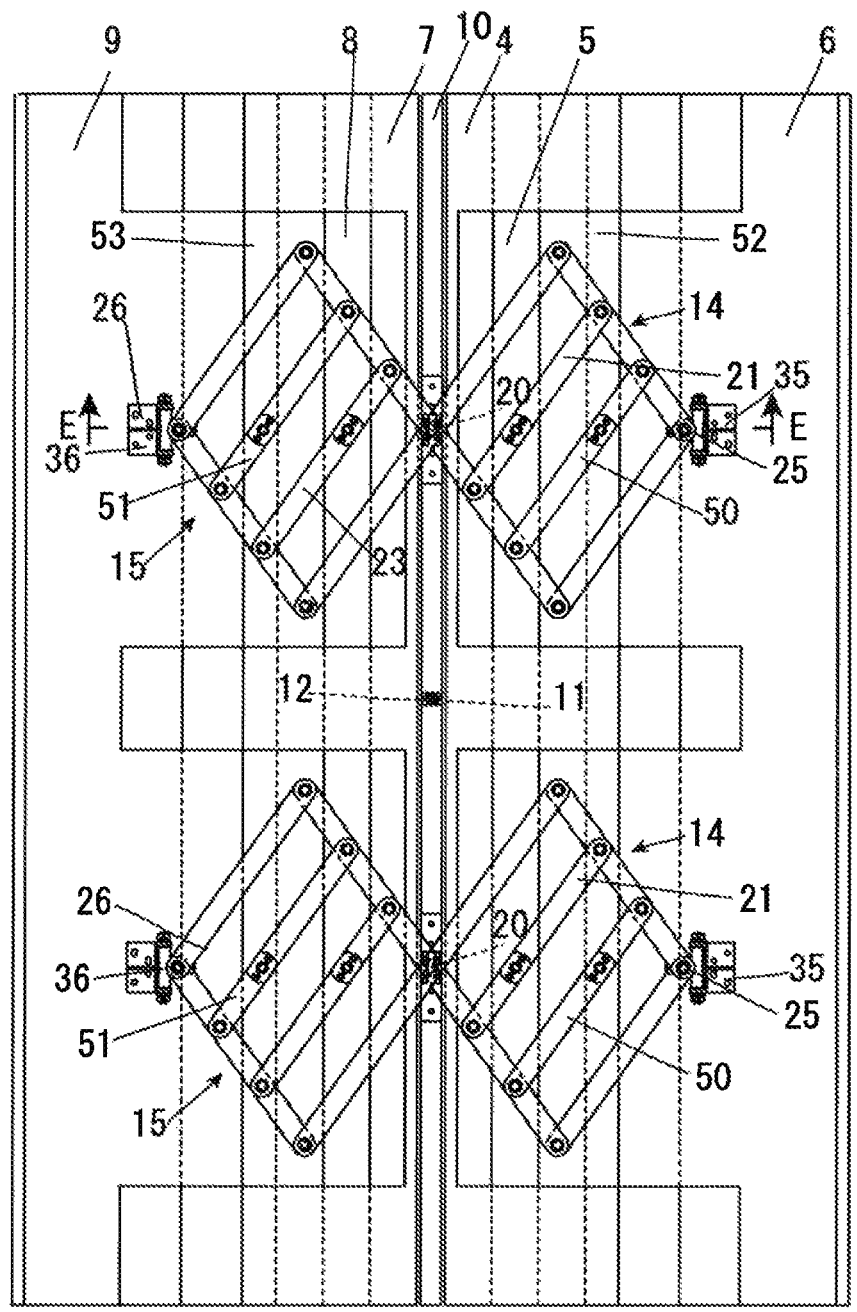
FIG. 9 is a schematic diagram when another example of the expansion device of panels according to the second embodiment of the present invention is viewed from outside the body.
Figure 10:
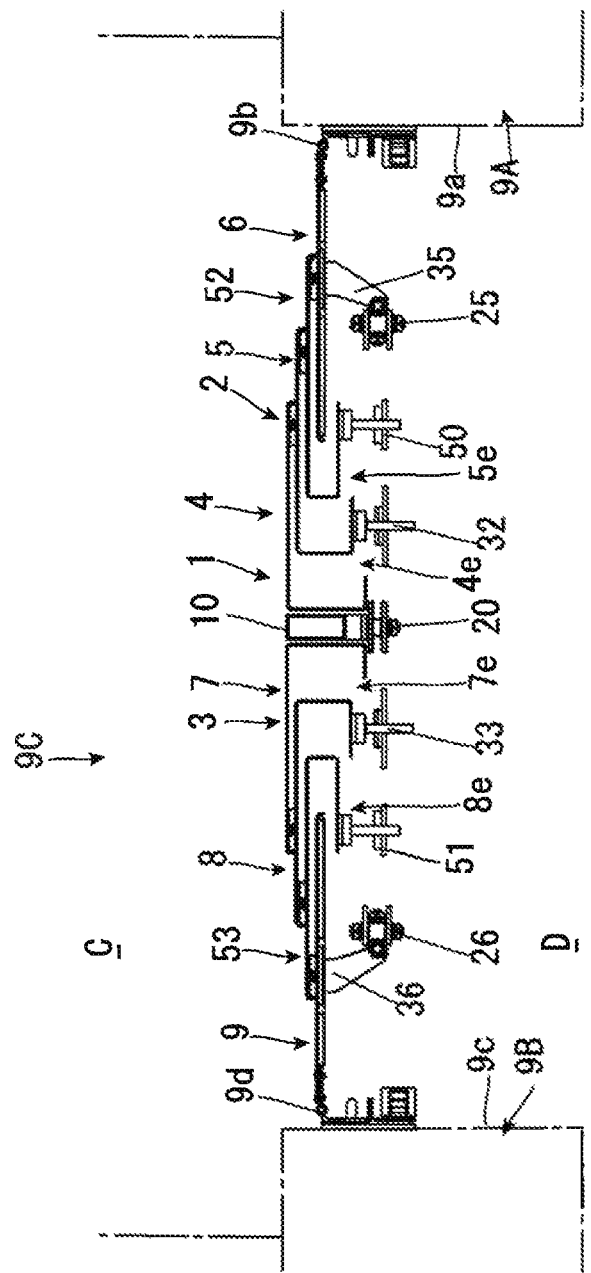
FIG. 10 is a schematic end view of an E-E line in FIG. 9.
Figure 11:
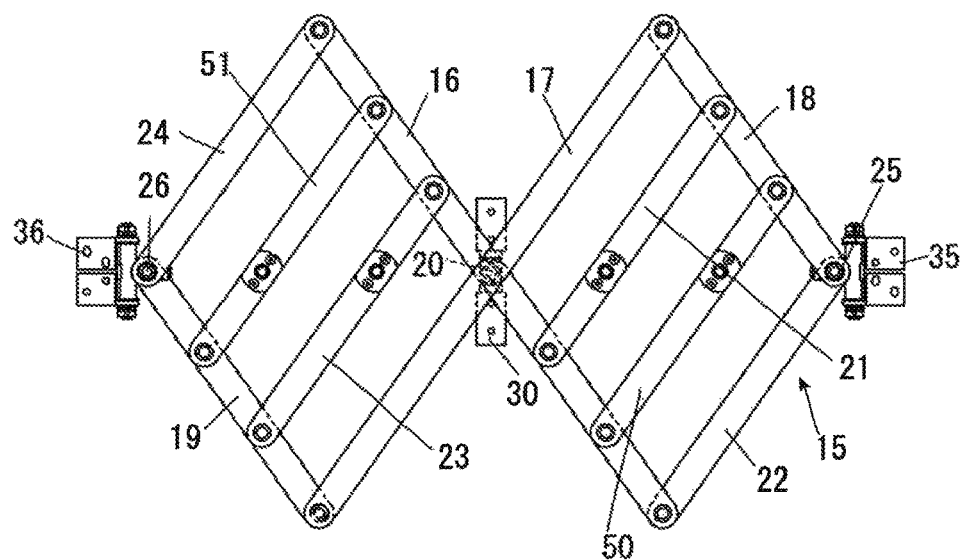
FIG. 11 is a side view of the link member used in FIG. 9.
Figure 12:
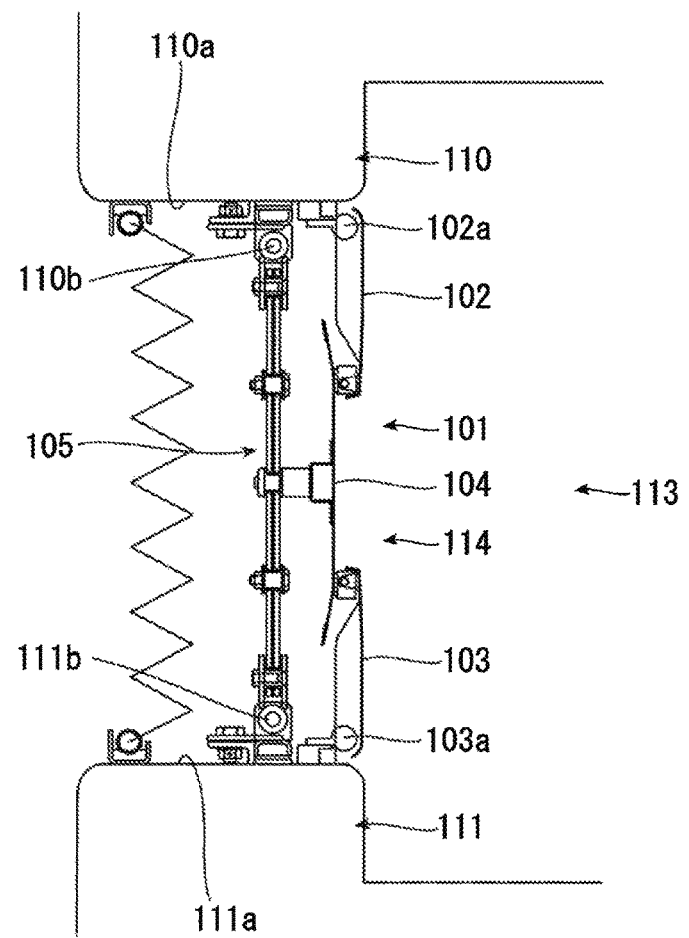
FIG. 12 is a cross-sectional view when an expansion device of panels in a conventional technology mounted between bodies is viewed from above.
Figure 13:
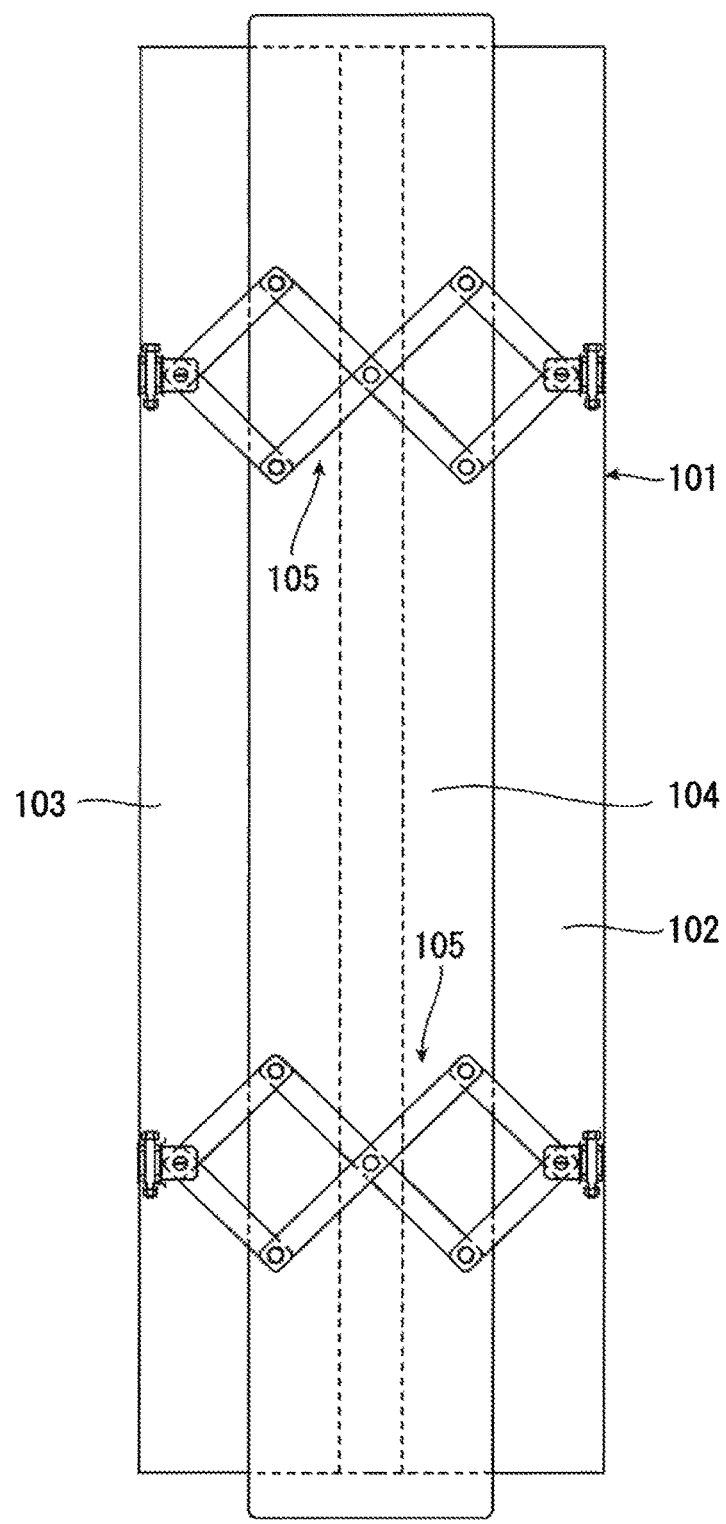
FIG. 13 is a view when the expansion device of panels in FIG. 12 is viewed from outside.

Also, as shown in FIGS. 9 to 11, the first constituent member 2 and that constituting the second constituent member 3 can each be constituted using four panels by increasing the number of connecting arm members provided in parallel with the second main arm member 17 between the first main arm member 16 and the first parallel arm member 18 by one for each of the first constituent member 2 side and the second constituent member 3 side, connecting arm members 50, 51, and connecting panels 52, 53 having a structure similar to that of the second panel 5 and the fifth panel 8 in the first embodiment to the connecting arm members 50, 51 that have been added.

The other structure is the same as that of the first embodiment and the description thereof is omitted.

Also in the second embodiment, the same effect as that of the first embodiment is achieved.

Third Embodiment

In the first and second embodiments, the columnar member 10 is provided between the first constituent member 2 and the second constituent member 3, but without providing the columnar member 10, the first constituent member 2 and the second constituent member 3 may be mutually rotatably connected by a rotation axis similar to the rotation axes 11, 12 in the central portion in the up and down direction.

The other structure is the same as that of the first and second embodiments and the description thereof is omitted.

Also in the third embodiment, the same effect as that of the first and second embodiments is achieved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An expansion device of panels comprising:
a first constituent member constructed such that at least portions of a plurality of panels overlap; and
a second constituent member constructed such that at least portions of a plurality of panels overlap,
wherein the first constituent member and the second constituent member are connected to a link member that can be expanded and contracted,
the first constituent member and the second constituent member are expanded and contracted by expansion and contraction of the link member,
the first constituent member and the second constituent member can relatively be rotated around rotation axes,
the link member includes a first main arm member and a second main arm member arranged mutually in an X shape,
a first parallel arm member is provided in parallel with the first main arm member and also rotatably connected to one end of the second main arm member,
a second parallel arm member is provided in parallel with the first main arm member and also rotatably connected to an other end of the second main arm member,
one or a plurality of connecting arm members is provided in parallel with the second main arm member and also one end thereof is rotatably connected to the first parallel arm member and the other end thereof is rotatably connected to the first main arm member,
one or a plurality of connecting arm members is provided in parallel with the second main arm member and also one end thereof is rotatably connected to the first main arm member and the other end thereof is rotatably connected to the second parallel arm member,
the link member is provided so as to be able to rotate around an axis perpendicular to an expansion/contraction direction of the link member with respect to the first constituent member and the second constituent member,
both ends in the expansion/contraction direction of the link member are connected to panels positioned outermost in the first constituent member and the second constituent member respectively, and
any one connecting arm member in the link member and a panel that is not positioned on both ends of the first constituent member and the second constituent member are connected.

2. The expansion device of panels according to claim 1, wherein the first constituent member and the second constituent member are connected such that each can also be parallel to or in an inclined positional relation to a direction of movement of members constituting the link member.

3. The expansion device of panels according to claim 1, wherein the expansion device of panels is provided between bodies of rolling stock.

* * * * *